Nov. 22, 1932.　　　K. GOES ET AL　　　1,888,264
LOADED SUBMARINE CABLE
Filed Dec. 5, 1930
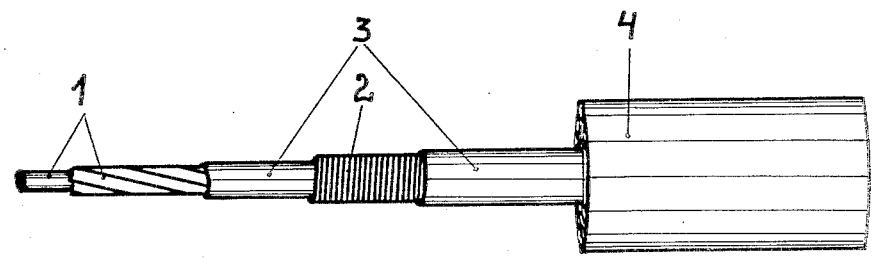
K. Goes
E. Budum
　INVENTORS
By: Marks & Clerk
　　ATT'YS.

Patented Nov. 22, 1932

1,888,264

UNITED STATES PATENT OFFICE

KONRAD GOES, OF ROSRATH, NEAR COLOGNE, AND ERNST BADUM, OF COLOGNE-MULHEIM, GERMANY, ASSIGNORS TO FELTEN & GUILLEAUME CARLSWERK ACTIENGESELLSCHAFT, OF COLOGNE-MULHEIM, GERMANY

LOADED SUBMARINE CABLE

Application filed December 5, 1930, Serial No. 500,418, and in Germany September 13, 1930.

Submarine cables provided with a covering consisting of a material of high initial permeability are known, in which the free spaces inside the cable are filled with a viscous material which equalizes the pressure. In cables as hitherto known the fillings consist of sticky, viscous, balsam-like substances as, for instance, bitumen, stearine pitch, or synthetic caoutchouc, which is polymerized only to a certain extent, or kinds of natural caoutchouc, gutta-percha, balata or mixtures thereof, to which a viscosity of the desired degree is imparted by depolymerization.

It has now been found that apart from the substances hitherto proposed for this purpose the substance known as hydro-caoutchouc is especially suitable for the purpose of embedding the sensitive loading material. Hydro-caoutchouc is produced by the treatment of ordinary, natural or synthetic caoutchouc with hydrogen in the presence of catalysts. A method for the production of hydro-caoutchouc has, for instance, been described in the German Patent No. 415871/39b.

Hydro-caoutchouc is not elastic but viscous and has mechanical properties which have been recognized to be favourable for the purpose of embedding the loading material. It has now been found that in addition thereto hydro-caoutchouc has also more favourable electrical properties as compared with the materials hitherto proposed and used and that it is therefore especially suitable for use in connection with cables.

Under certain circumstances it may be found suitable for mechanical or electrical reasons to use for the embedding material not exclusively hydro-caoutchouc. In this case it is possible to use hydro-caoutchouc with other substances suitable for embedding by being mixed therewith or combined in layers. Suitable substances for this purpose are preferably synthetic caoutchouc which is polymerized only to a certain extent, gutta-percha, balata and bitumen.

A submarine cable according to the invention is illustrated by way of example in the accompanying drawing. The copper strand 1 which consists of circular and shaped wires is surrounded by the closely wound magnetic loading material 2, which is embedded in the pressure equalizing means 3 consisting of hydrocaoutchouc and the latter is in its turn surrounded by the insulation 4.

What we claim is:—

1. A submarine cable including a conductor, a layer of loading material surrounding said conductor and a filling comprising hydrocaoutchouc wherein the layer of loading material is embedded.

2. A submarine cable including a conductor, a layer of loading material surrounding said conductor and a filling comprising a mixture of hydrocaoutchouc and thermoplastic material wherein the layer of loading material is embedded.

3. A submarine cable including a conductor, a layer of loading material surrounding said conductor and a filling comprising layers of hydrocaoutchouc and thermoplastic materials wherein the layer of loading material is embedded.

In testimony whereof we have signed our names to this specification.

KONRAD GOES.
ERNST BADUM.